(12) United States Patent
Nagai et al.

(10) Patent No.: US 8,524,323 B2
(45) Date of Patent: Sep. 3, 2013

(54) SURFACE TREATMENT LIQUID FOR ZINC-BASED METAL MATERIAL AND METHOD FOR SURFACE-TREATING ZINC-BASED METAL MATERIAL

(76) Inventors: Hidenori Nagai, Tokyo (JP); Ryosuke Kawagoshi, Tokyo (JP); Yukoh Takanashi, Tokyo (JP)

( * ) Notice: Subject to any disclaimer, the term of this patent is extended or adjusted under 35 U.S.C. 154(b) by 804 days.

(21) Appl. No.: 12/576,628

(22) Filed: Oct. 9, 2009

(65) Prior Publication Data

US 2010/0028541 A1 Feb. 4, 2010

Related U.S. Application Data

(63) Continuation of application No. PCT/JP2008/057178, filed on Apr. 11, 2008.

(30) Foreign Application Priority Data

Apr. 13, 2007 (JP) ................................. 2007-105955

(51) Int. Cl.
*B05D 3/00* (2006.01)
(52) U.S. Cl.
USPC ......... 427/327; 427/328; 427/331; 427/372.2
(58) Field of Classification Search
USPC .................................. 427/327–330
See application file for complete search history.

(56) References Cited

U.S. PATENT DOCUMENTS

| | | | |
|---|---|---|---|
| 6,488,990 B1 * | 12/2002 | Wetterer et al. | 427/409 |
| 2003/0148122 A1 | 8/2003 | Oshima et al. | |
| 2004/0144451 A1 | 7/2004 | Matsukawa et al. | |
| 2005/0103229 A1 | 5/2005 | Tanaka et al. | |
| 2006/0185769 A1 | 8/2006 | Nakayama et al. | |
| 2007/0298174 A1 * | 12/2007 | Kolberg et al. | 427/352 |
| 2009/0065099 A1 | 3/2009 | Makino et al. | |

FOREIGN PATENT DOCUMENTS

| | | |
|---|---|---|
| JP | 56136978 A | 10/1981 |
| JP | 5009746 A | 1/1993 |
| JP | 2000282255 | 10/2000 |
| JP | 2003166074 A | 6/2003 |
| JP | 2003-201576 A | 7/2003 |
| JP | 2004218072 A | 5/2004 |
| JP | 2004190121 A | 8/2004 |
| JP | 2004218074 A | 8/2004 |
| JP | 2004218075 A | 8/2004 |
| JP | 2005-264230 A | 9/2005 |
| JP | 2005264230 A * | 9/2005 |
| JP | 2006-241579 A | 9/2006 |
| WO | WO 2006050916 A2 * | 5/2006 |

OTHER PUBLICATIONS

International Search Report issued against International Application No. PCT/JP2008/057178.

* cited by examiner

*Primary Examiner* — David Turocy
(74) *Attorney, Agent, or Firm* — Mary K. Cameron

(57) ABSTRACT

Disclosed is a surface treatment liquid containing no chromium compound, which is capable of imparting a zinc-based material with adequate corrosion resistance without coating, namely adequate bare corrosion resistance. Specifically disclosed is a surface treatment liquid for zinc-based metal materials, which contains the following component (A) and component (B): (A) at least one metal element selected from the group consisting of Ti, Zr and Hf; and (B) at least one compound selected from the group consisting of allylamino compounds, imino compounds, amino polysaccharides, amino-modified phenols and derivatives of them. The total concentration of the metal elements of the component (A) is 500-2000 mg/L, and the total concentration of the compounds of the component (B) is 300-3000 mg/L.

16 Claims, No Drawings

SURFACE TREATMENT LIQUID FOR ZINC-BASED METAL MATERIAL AND METHOD FOR SURFACE-TREATING ZINC-BASED METAL MATERIAL

This application is a continuation of international application PCT/JP2008/057178, filed on Apr. 11, 2008, which claims benefit of Japanese Application JP 2007-105955, filed on Apr. 13, 2007, the contents of each of which are incorporated herein by reference in their entirety.

FIELD OF THE INVENTION

The present invention relates to a surface treatment liquid for a zinc-based metallic material for forming a coating on the surface of a zinc-based metallic material and a surface treatment method for a zinc-based metallic material using it.

BACKGROUND OF THE INVENTION

When a metallic material is left in the air, in general, water in the atmosphere adsorbs to its surface, and a corrosion factor such as $SO_2$, $NO_x$, and Cl, also, flows in the air and adsorbs to its surface. The metallic material under such an environment will corrode by the coexistence of water and the corrosion factor. In order to reduce such corrosion of metallic materials by water and corrosion factor, various surface treatment techniques have been developed.

The corrosion prevention method for metal can be in general roughly divided into two types: one is a method by coating, and the other is a method used without coating such as chromate treatment on a galvanized material. In the two types of corrosion prevention methods, surface treatment is absolutely performed.

When a coating is applied on a steel material, for example, a method in which cleaning treatment is performed on the steel material, and zinc phosphate treatment is then performed thereon and a method in which in the above method chromate treatment or phosphoric-acid chromate treatment is further performed after the zinc phosphate treatment are known.

Steel materials having various kinds of galvanization may be used without a coating. In such a case, a method is known in which cleaning treatment is performed on a steel material, and then without performing zinc phosphate treatment, chromate treatment or phosphoric-acid chromate treatment is performed.

In such a case aiming at using a metallic material in the bare condition without a coating, general surface treatment processes to be performed on a metallic material include degreasing treatment, galvanization, acid cleaning, chemical conversion treatment, and drying in this order. The above chromate treatment or the like is performed as the "chemical conversion treatment" in the above processes.

Agents for use in such chromate treatment and phosphoric-acid chromate treatment are low in price and provide a resultant coating with good corrosion resistance. However, hexavalent chromium contained in a treatment liquid is harmful and considering recent environmental restrictions, chromate treatment and phosphoric-acid chromate treatment tend to be refrained from being used.

In recent trends, trivalent chromium treatment using a harmless trivalent chromium compound has been proposed as a surface treatment method in which, for example, a zinc-based metallic material such as an electrogalvanized steel sheet is provided with corrosion resistance without using harmful hexavalent chromium.

The trivalent chromium treatment includes mainly electrolytic trivalent chromate treatment, dry-in-place type trivalent chromate treatment, and reaction type trivalent chromate treatment (See Patent Documents 1 to 3, for example). Some of these pieces of trivalent chromate treatment show performance exceeding the hexavalent chromate treatment and are regarded as a very likely technique alternative to the harmful hexavalent chromate treatment.

However, although trivalent chromium itself for use in the trivalent chromate treatment is harmless, it is still a chromium compound, and may be changed into hexavalent chromium through an oxidation reaction. With recent growing consciousness about environmental problems worldwide, there is a strong movement under way to avoid use of substances which may have a detrimental effect on the environment even in a small extent, there is a possibility that even use of trivalent chromium will be banned in the future.

A chemical conversion technique without using chromium (non-chromium technique) on nonferrous materials other than the zinc-based metallic material such as an aluminum-containing material has been studied for relatively a long time from the standpoint of anti-corrosiveness. For example, an aluminum-containing material for use in food and drink has been studied from around 1990, and has been in practical use.

A representative chemical conversion treatment liquid containing no chromium on the aluminum-containing material is disclosed in Patent Document 4. The treatment liquid contains zirconium or titanium or their mixture, phosphate, and fluoride, and is an acidic water-based surface treatment liquid with a pH of about 1.0 to 4.0. Performing treatment using this treatment liquid forms a precipitated coating having a phosphorous compound of zirconium or titanium as a main component on the surface of an aluminum-containing metallic material.

However, it is known that the precipitated coating having a phosphorous compound of zirconium or titanium as a main component is very thin, and if it is thickened, cracks occur on its surface. When it is actually used for printing on beverage cans, therefore, the coating is controlled to have low coating weight.

Furthermore, surface treatment methods which use no chromium and provide the surface of metallic materials with good corrosion resistance are disclosed in Patent Documents 5 to 9.

Patent Document 1: Japanese Patent Laid-open No. 5-009746
Patent Document 2: Japanese Patent Laid-open No. 2000-282255
Patent Document 3: Japanese Patent Laid-open No. 2003-166074
Patent Document 4: Japanese Patent Laid-open No. 56-136978
Patent Document 5: Japanese Patent Laid-open No. 2004-190121
Patent Document 6 Japanese Patent Laid-open No. 2004-218072
Patent Document 7: Japanese Patent Laid-open No. 2004-218074
Patent Document 8: Japanese Patent Laid-open No. 2004-218075
Patent Document 9: Japanese Patent Laid-open No. 2005-264230

DISCLOSURE OF THE INVENTION

However, the surface treatment methods disclosed in Patent Documents 5 to 9 are all on the basis of being used for the primary coating treatment for a coating, and do not intend to use metallic materials without a coating.

The objects of the present invention are, therefore, to provide a surface treatment liquid which contains no chromium compounds and can provide a zinc-base metallic material with corrosion resistance with no coating, that is, bare corrosion resistance and a surface treatment method using it.

The present inventors, as a result of intensive studies, found that a zinc-based metallic material can be provided with outstanding bare corrosion resistance by performing treatment on it using a surface treatment liquid containing at least one metallic element selected from the group consisting of Ti, Zr, and Hf and at least one compound selected from the group consisting of an allylamino compound, an imino compound, aminated polysaccharide, amino-modified phenol, and derivatives thereof, and has achieved the present invention.

The present invention provides the following (i) to (ix):

(i) A surface treatment liquid for a zinc-based metallic material containing the following components (A) and (B):

(A) at least one metallic element selected from the group consisting of Ti, Zr, and Hf; and (B) at least one compound selected from the group consisting of an allylamino compound, an imino compound, aminated polysaccharide, amino-modified phenol, and derivatives thereof, wherein the total concentration of the metallic elements of the component (A) is 500 to 2000 mg/L, and the total concentration of the compounds of the component (B) is 300 to 3000 mg/L.

(ii) The surface treatment liquid for a zinc-based metallic material according to the above (i), further containing the following components (C) and (D)

(C) fluorine, and (D) at least one metallic element selected from the group consisting of Mg, Al, Zn, Cu, and Co, wherein the total concentration of the metallic elements of the component (D) is 500 to 1000 mg/L.

(iii) The surface treatment liquid for a zinc-based metallic material according to the above (i) or (ii), further containing the following component (E)

(E) at least one compound selected from the group consisting of $HNO_3$, $HNO_2$, $H_2O_2$, and salts thereof.

(iv) The surface treatment liquid for a zinc-based metallic material according to any one of the above (i) to (iii), of which the pH is 2 to 5.

(v) A surface treatment method for a zinc-based metallic material comprising a surface treatment process in which a zinc-based metallic material is brought into contact with the surface treatment liquid for a zinc-based metallic material described in any one of the above (i) to (iv).

(vi) The surface treatment method for a zinc-based metallic material according to the above (v) comprising a post-treatment process in which the zinc-based metallic material is brought into contact with a post-treatment liquid containing at least one compound selected from the group consisting of phosphoric acid, hydrogen peroxide, amino-modified phenol, an amino-modified phenol derivative, and an organophosphorus compound after the surface treatment process.

(vii) The surface treatment method for a zinc-based metallic material according to the above (vi), wherein a complex coating formed on the surface of the zinc-based metallic material in the post-treatment process satisfies the following equations (1) to (3):

$$Wa \geq 50 \text{ mg/m}^2 \quad (1)$$

$$Wb \geq 20 \text{ mg/m}^2 \quad (2)$$

$$Wp \geq 5 \text{ mg/m}^2 \quad (3),$$

wherein

Wa is the coating mass of the metallic elements of the component (A), Wb is the carbon-equivalent coating mass of the compounds of the component (B), and Wp is the sum of the coating mass of a phosphorus element and the carbon-equivalent coating mass of organic compounds contained in the post-treatment liquid.

(viii) The surface treatment method for a zinc-based metallic material according to the above (vi) or (vii), wherein the pH of the post-treatment liquid is 3 to 6.

(ix) The surface treatment method for a zinc-based metallic material according to any one of the above (v) to (viii), further comprising a degreasing process for performing degreasing treatment on the zinc-based metallic material before the surface treatment process.

The surface treatment liquid for a zinc-based metallic material of the present invention contains no chromium compound and can provide a zinc-base metallic material with superior bare corrosion resistance.

DETAILED DESCRIPTION OF THE PREFERRED EMBODIMENTS

Hereinafter, the surface treatment liquid for a zinc-based metallic material of the present invention (hereinafter simply referred to as "the treatment liquid of the present invention") and the surface treatment method for a zinc-based metallic material of the present invention (hereinafter simply referred to as "the treatment method of the present invention") will be described in detail.

The treatment liquid of the present invention is a surface treatment liquid for a zinc-based metallic material containing the following components (A) and (B): at least one metallic element selected from the group consisting of Ti, Zr, and Hf; and at least one compound selected from the group consisting of an allylamino compound, an imino compound, aminated polysaccharide, amino-modified phenol, and derivatives thereof, wherein the total concentration of the metallic elements of the component (A) is 500 to 2000 mg/L, and the total concentration of the compounds of the component (B) is 300 to 3000 mg/L.

An object of surface treatment by the treatment liquid of the present invention is a zinc-based metallic material.

The zinc-based metallic material includes, for example, but not limited to, zinc die-cast and zinc-containing plating. The zinc-containing plating is plated with zinc or zinc and other metals (alloys and unavoidable impurities with at least one from the group comprising, for example, nickel, iron, aluminum, manganese, chromium, magnesium, cobalt, lead, and antimony). The plating method is not particularly limited, and includes, for example, hot dipping, electroplating, and vapor deposition plating.

The zinc-based metallic material is not particularly limited in shape (for example, plate-shaped and rod-shaped), structure, junction method, and junction species.

The treatment liquid of the present invention contains the component (A) and the component (B).

The component (A) is at least one metallic element selected from the group consisting of Ti, Zr, and Hf.

The source of supply of the component (A) includes, for example, $TiCl_4$, $Ti(SO_4)_2$, $TiOSO_4$, $Ti(NO_3)_4$, $TiO(NO_3)_2$, $Ti(OH)_4$, $TiO_2OC_2O_4$, $H_2TiF_6$, salts of $H_2TiF_6$ (for example, $K_2TiF_6$), TiO, $TiO_2$, $Ti_2O_3$, $TiF_4$, $ZrCl_4$, $ZrOCl_2$, $Zr(OH)_2Cl_2$, $Zr(OH)_3Cl$, $Zr(SO_4)_2$, $ZrOSO_4$, $Zr(NO_3)_4$, $ZrO(NO_3)_2$, $Zr(OH)_4$, $H_2ZrF_6$, salts of $H_2ZrF_6$, $H_2(Zr(CO_3)_2(OH)_2)$, salts of $H_2(Zr(CO_3)_2(OH)_2)$, $H_2Zr(OH)_2(SO_4)_2$, salts of $H_2Zr(OH)_2(SO_4)_2$, $ZrO_2$, $ZrOBr_2$, $ZrF_4$, $HfCl_4$, $Hf(SO_4)_2$, $H_2HfF_6$, salts of $H_2HfF_6$, $HfO_2$, and $HfF_4$. Two or more of these may be used in combination.

In the treatment liquid of the present invention, the total concentration of the metallic elements of the component (A) is 500 to 2000 mg/L, and preferably 600 to 1500 mg/L. The above range achieves superior bare corrosion resistance.

The component (B) is at least one compound selected from the group consisting of an allylamino compound, an imino compound, aminated polysaccharide, amino-modified phenol, and derivatives thereof.

The allylamino compound is an organic compound having a structure in which an amino group is bonded to a 2-propenyl skeleton ($—CH_2—CH=CH_2$).

The allylamino compound and its derivative include, for example, allylamine, allylamine salt (a salt of allylamine with acid), diallylamine, diallylamine salt (a salt of diallylamine with acid), polyallylamine, polydiallylamine, and polymers thereof.

Although the allylamino compound is not particularly limited in molecular weight, its weight average molecular weight is preferably 1000 to 5000. The above range forms a coating with superior bare corrosion resistance owing to the coating effect of the allylamino compound.

The imino compound is a compound having a structure in which a nitrogen atom is bonded to a hydrocarbon-substituted secondary carbon atom through a double bond ($>C=N—R$).

The imino compound and its derivative include, for example, 2-propaneimine, 1,2-ethanediimine, N-methylethaneimine, ethyleneimine, polyethyleneimine, propyleneimine, and polypropyleneimine.

Although the imino compound is not particularly limited in molecular weight, its weight average molecular weight is preferably 5000 to 100000. The above range forms a coating with superior bare corrosion resistance owing to the coating effect of the imino compound.

The aminated polysaccharide is an organic compound in which monosaccharides with amino groups are bonded in a chain, and may be a natural product.

The aminated polysaccharide and its derivative include, specifically, for example, chitin, chitosan, hyaluronic acid, chondroitin sulfuric acid, and streptomycin. The aminated polysaccharide and its derivative are not particularly limited in molecular weight.

The amino-modified phenols is an organic compound having a structure in which an amino group is introduced into an organic skeleton having a hydroxyphenyl group ($—C_6H_4OH$).

The amino-modified phenol includes, specifically, for example, an aminated compound of p-vinylphenol, an aminated compound of bisphenol, an aminated compound of phenol sulfonic acid, and polymers thereof.

The amino-modified phenol and its derivative are not particularly limited in molecular weight.

In the treatment liquid of the present invention, the total concentration of the compounds of the component (B) is 300 mg/L or more, preferably 500 mg/L or more, more preferably 600 mg/L or more, and much more preferably 1000 mg/L. The above range achieves a coating with superior bare corrosion resistance.

In the surface treatment liquid of the present invention, the total concentration of the compounds of the component (B) is 3000 mg/L or less, preferably 2000 mg/L or less, and more preferably 1800 mg/L or less.

The treatment liquid of the present invention, in one embodiment, further contains the following components (C) and (D):

(C) fluorine, and (D) at least one metallic element selected from the group consisting of Mg, Al, Zn, Cu, and Co.

The component (C) is fluorine.

The supply source of the component (C) includes, for example, HF, $H_2HfF_6$, $HfF_4$, $H_2TiF_6$, $TiF_4$, $H_2ZrF_6$, $ZrF_4$, $HBF_4$, salts of $HBF_4$, $NaHF_2$, $KHF_2$, $NH_4HF_2$, NaF, KF, and $NH_4F$. Two or more of these may be used in combination.

In the treatment liquid of the present invention, the content of the above component (C) is preferably 5 to 50 ppm, and more preferably 10 to 30 ppm in the free fluorine ion concentration measured by a fluorine ion meter (for example, the IM55G manufactured by Toa Electronics Ltd.). The above range can precipitate a coating with superior bare corrosion resistance uniformly.

The component (D) is at least one metallic element selected from the group consisting of Mg, Al, Zn, Cu, and Co.

The supply source of the component (D) includes, for example, oxides, hydroxides, chlorides, sulfates, and carbonates of Mg, Al, Zn, Cu, and Co. Two or more of these may be used in combination.

In the treatment liquid of the present invention, the total concentration of the metallic elements of the component (D) is preferably 500 to 10000 mg/L, and more preferably 1000 to 5000 mg/L. The above range can precipitate a coating with superior bare corrosion resistance rapidly and efficiently.

The treatment liquid of the present invention, in one embodiment, further contains the following component (E):

(E): at least one compound selected from the group consisting of $HNO_3$, $HNO_2$, $H_2O_2$, and salts thereof.

Salts of $HNO_3$, $HNO_2$, and $H_2O_2$ include, for example, $NH_4NO_3$, $Mg(NO_3)_2$, $Al(NO_3)_3$, $NaNO_2$, and $NH_4NO_2$.

These may be one added to the treatment liquid intentionally, or may be one generated for an unavoidable reason such as nitrous acid ($HNO_2$) generated in the treatment liquid through the reduction reaction of nitric acid. These act on the zinc-base metallic material as an oxidizer and facilitate a coating formation reaction.

In the treatment liquid of the present invention, the total concentration of the compounds of the above component (E) is preferably 1000 to 50000 mg/L, and more preferably 5000 to 25000 mg/L. The above range facilitates the coating formation reaction more efficiently.

As represented by $HNO_3$, when it functions also as acid for maintaining the component of the zinc-based metallic material which has been etched and dissolved in a treatment bath, its content may be increased as needed.

The treatment liquid of the present invention may further contain at least one surfactant selected from the group consisting of a nonionic surfactant, an anionic surfactant, a cationic surfactant, and an ampholytic surfactant.

As the nonionic surfactant, anionic surfactant, cationic surfactant, and ampholytic surfactant, those known in the art may be used, respectively.

When the treatment liquid of the present invention contains these surfactants, a favorable coating can be formed without performing degreasing treatment on the zinc-based metallic material and cleaning it in advance. In other words, the treatment liquid of the present invention containing the surfactants can be used as a surface treatment agent serving as both degreasing and chemical conversion.

The pH of the treatment liquid of the present invention is preferably 2 to 5. The above range allows the components in the treatment liquid to exist stably, facilitating the coating precipitation reaction.

When the pH of the treatment liquid is required to be adjusted, an agent to be used is not particularly limited. In order to adjust it to the alkali side, for example, an alkali such as sodium hydroxide, potassium hydroxide, ammonium, and ammonium salt; and salts thereof (for example, sodium salts and potassium salts) may be used, while in order to adjust it to the acid side, for example, an acid such as nitric acid, hydrofluoric acid, hydrochloric acid, sulfuric acid, and acetic acid; and salts thereof (for example, sodium hydrogen fluoride and ammonium hydrogen fluoride) may be used.

The treatment method of the present invention comprises a surface treatment process in which a zinc-based metallic material is brought into contact with the above treatment liquid of the present invention.

The zinc-based metallic material is brought into contact with the treatment liquid of the present invention, thereby precipitating a coating containing an oxide and/or hydroxide of the metallic element of the component (A) on the surface thereof, and forming a surface treatment coating layer with superior bare corrosion resistance.

It is chemically difficult to obtain the above hydroxide of the metallic element as a pure hydroxide, and in general, the above oxide of the metallic element with hydrated water added is, too, included in the concept of the hydroxide.

The above hydroxide of the metallic element becomes an oxide finally by heating it. It is therefore considered that the structure of the surface treatment coating layer of the present invention is in a state in which an oxide and a hydroxide coexist when it is dried at ambient temperatures or low temperatures after performing the surface treatment, and is in an oxide-only or oxide-rich state when it is dried at higher temperatures after performing the surface treatment.

The treatment method of the present invention, in a preferable embodiment, comprises degreasing treatment for performing degreasing treatment on the zinc-based metallic material before the surface treatment process. The method of degreasing treatment is not particularly limited, and known methods in the art may be used. However, in such a case that the zinc-base metallic material is obtained through a degreasing process and a plating process, and is sent continuously to the surface treatment process, performing the degreasing process is meaningless.

As described above, when the treatment liquid of the present invention contains the above surfactants, a favorable coating can be formed without performing degreasing treatment on the zinc-based metallic material and cleaning it in advance. In other words, in this case, degreasing treatment and chemical conversion treatment on the zinc-based metallic material are performed simultaneously in the surface treatment process.

The treatment method of the present invention, in a preferable embodiment in some cases, comprises an acid cleaning process for performing acid cleaning treatment on the zinc-base metallic material before the surface treatment process.

The method of the acid cleaning treatment is not particularly limited, and known methods in the art may be used. The type of acid to be used in the acid cleaning is not particularly limited, and includes, for example, nitric acid, hydrofluoric acid, sulfuric acid, ammonium hydrogen fluoride, and other acidic aqueous solutions. Two or more of these may be used in combination.

By performing the acid cleaning treatment, the corrosion resistance and brilliance of the zinc-based metallic material and the uniformity of a coating to be formed are improved.

The method for bringing the zinc-based metallic material into contact with the treatment liquid of the present invention is not particularly limited, and includes, for example, spraying treatment, immersion treatment, and pouring treatment. Two or more of these may be used in combination (for example, combined use of the immersion treatment and spraying treatment).

The presence or absence of stirring within a treatment liquid bath in the immersion treatment and spraying pressure and the type of a spraying nozzle in the spraying treatment are not particularly limited, and any mode may be used if desired treatment can be completed without falling the object to be treated, or the zinc-based metallic material, from a jig, regardless of its size.

In the treatment method of the present invention, electrolytic treatment with a zinc-based metallic material as the cathode being in contact with the treatment liquid of the present invention may be performed.

In this case, the reduction reaction of hydrogen occurs on the boundary surface of the zinc-based metallic material as the cathode, thereby increasing pH. Along with the increase in pH, the stability of the metallic element of the component (A) on the boundary surface of the cathode decreases, allowing a surface treatment coating to be precipitated as an oxide or a hydroxide containing water.

In the treatment method of the present invention, use conditions of the treatment liquid of the present invention are not particularly limited.

Treatment temperature is preferably 30 to 60° C., and preferably 40 to 50° C. The treatment temperature of 60° C. or less is preferably from an economic standpoint, since wasteful energy use can be suppressed.

Treatment time can be set arbitrarily.

The treatment method of the present invention preferably comprises a rinsing process for performing rinsing treatment after the surface treatment process.

Since the treatment liquid for use in the surface treatment process is acidic, when the treatment liquid is kept in contact with an object to be treated, dissolution of the zinc-based metallic material proceeds, and desired corrosion resistance cannot be obtained in some cases. Performing the rinsing process can prevent such a problem.

The method of the rinsing treatment is not particularly limited, and known methods in the art may be used.

The treatment method of the present invention preferably comprises a post-treatment process in which the zinc-based metallic material is brought into contact with a post-treatment liquid containing at least one compound selected from the group consisting of phosphoric acid, amino-modified phenol, an amino-modified phenol derivative, and an organophosphorus compound after the surface treatment process (preferably after the above rinsing process). Performing the post-treatment process forms a sealing film with the components of the post-treatment liquid on the coating, providing more superior bare corrosion resistance.

The amino-modified phenol and the amino-modified phenol derivative are the same as those used in the above treatment liquid.

The organophosphorus compound includes, specifically, for example, phytic acid, phosphate (for example, 1-hydroxyethyl-1-phosphonic acid and 1-hydroxyethylidene-1,1-diphosphonic acid), and amino polyphosphonic acid (for example, ethylene diamine tetramethylene phosphonic acid (EDTMP)).

In the post-treatment liquid, the total of the above compounds is preferably 5 to 50 mg/L, and more preferably 10 to 30 mg/L. The above range provides more superior bare corrosion resistance.

The pH of the post-treatment liquid is preferably 3 to 6. The above range allows the components of the post-treatment liquid to exist stably and provides good covering characteristics for the surface of an object to be treated.

When the pH of the post-treatment liquid is required to be adjusted, an agent to be used is not particularly limited, and for example, the above agents used for pH adjustment of the treatment liquid of the preset invention may be used. When the post-treatment process is performed in the treatment method of the present invention, use conditions of the post-treatment liquid are not particularly limited.

Treatment temperature is preferably 30 to 60° C., and more preferably 40 to 50° C. The treatment temperature of 60° C. or less is preferably from an economic standpoint, since wasteful energy use can be suppressed.

Treatment time can be set arbitrarily.

The treatment method of the present invention preferably comprises a rinsing process for performing rinsing treatment after the post-treatment process. When an object to be treated is complex in shape, and liquid accumulation is likely to be formed, in particular, the rinsing process is preferably provided in order to make the covering characteristics of the components of the post-treatment liquid uniform.

The method of the rinsing treatment is not particularly limited, and known methods in the art may be used.

In the present invention, water is preferably removed before the zinc-based metallic material is finally shipped. For that purpose, drying is preferably performed.

The method of drying is not particularly limited, and includes, for example, a method of drying with a hot-air circulating type electric oven and a method in which an object to be treated itself is heated through hot-water washing in the final process of the treatment process and drying it with remaining heat through exposure to the atmosphere or air blowing.

A complex coating formed on the surface of the above zinc-based metallic material in the post-treatment process preferably satisfies the following equations (1) to (3) in order to provide more superior bare corrosion resistance.

$$Wa \geq 50 \text{ mg/m}^2 \quad (1)$$

$$Wb \geq 20 \text{ mg/m}^2 \quad (2)$$

$$Wp \geq 5 \text{ mg/m}^2 \quad (3)$$

In the equations, Wa is the coating mass of the metallic elements of the component (A), Wb is the carbon-equivalent coating mass of the compounds of the component (B), and Wp is the sum of the coating mass of a phosphorus element and the carbon-equivalent coating mass of organic compounds contained in the post-treatment liquid. When the phosphorous element is not contained in the above post-treatment liquid, "the coating mass of a phosphorus element" here is zero. The same holds when the above organic compounds are not contained in the above post-treatment liquid.

The zinc-based metallic material formed with a coating obtained by the treatment method of the present invention is superior in bare corrosion resistance. The zinc-based metallic material formed with a coating obtained by the treatment method of the present invention can be therefore preferably used for uses in which coating is not applied. In the uses, it can be used for both interior use and exterior use.

EXAMPLES

Hereinafter, the present invention will be described specifically with reference to examples, but the present invention is not limited thereto.

(Plate to be Treated)

The breakdown of the plate to be treated used in Examples and Comparative Examples is shown below.

EG plate (Electronic Galvanized Steel (an electrogalvanized steel sheet, with the thickness of 6 μm)

A zinc alloy die-cast plate (Zinc Alloys Die Casting, JISH 5301)

(Treatment Processes)

The treatment processes of Examples and Comparative Examples are as follows:

For Examples 1 to 3 and Comparative Example 2: acid cleaning→rinsing→surface treatment process→pure-water rinsing→hot-air drying For Examples 4 to 19 and Comparative Examples 3 to 7: acid cleaning→rinsing→surface treatment process→rinsing→post-treatment process→pure-water rinsing→hot-air drying For Example 20: alkali degreasing→rinsing→surface treatment process→rinsing→post-treatment process→pure-water rinsing→hot-air drying For Comparative Example 1: acid cleaning→rinsing→surface treatment process by chromate treatment→pure-water rinsing→hot-air drying In the above, the acid cleaning was performed by immersing the plate to be treated in an aqueous solution of ammonium hydrogen fluoride with a concentration of 1 g/L at room temperature for 30 seconds.

The alkali degreasing was performed by diluting the FINECLEANER E2001 (Registered trademark: manufactured by Nihon Parkerizing Co., Ltd.) to 2 wt % with tap water, and spraying it on the plate to be treated at 40° C. for 120 seconds. The surface treatment process was performed by immersing the plate to be treated in the surface treatment liquid described below for the times shown in Table 1. The surface treatment process by chromate treatment was performed by immersing the plate to be treated in the surface treatment liquid described below so that the chromium coating mass becomes 30 mg/m$^2$.

The post-treatment process was performed by immersing the plate to treated in the post-treatment liquid described below for the time shown in Table 1.

The rinsing was performed by spraying tap water on the plate to be treated at room temperature for 30 seconds.

The pure-water rinsing was performed by spraying ion exchanged water at room temperature for 30 seconds.

The hot-air drying was performed by holding the plate to be treated in a hot-air drying furnace for 5 minutes at a temperature of 90° C.

(Surface Treatment Liquid and Post-Treatment Liquid)

Example 1

Using an aqueous solution of hafnium nitrate (IV), magnesium chloride, zinc sulfate, and cobalt nitrate, an aqueous solution with a hafnium concentration of 500 mg/L, and the total concentration of magnesium, zinc, and cobalt of 1600 mg/L was prepared. Polyallylamine with a weight average molecular weight of 3000 was added to the above aqueous solution so as to have a solid content concentration of 600 mg/L. The aqueous solution was then heated to 45° C., and 50 mg/L of $H_2O_2$ was added thereto. Using aqueous ammonia and hydrofluoric acid, the aqueous solution adjusted so as to have a pH of 3.8 and a free fluorine concentration of 25 mg/L was provided as a surface treatment liquid.

Example 2

Using an aqueous solution of hexafluoro titanic (IV) acid, magnesium nitrate, aluminum nitrate, and zinc nitrate, an aqueous solution with a titanium concentration of 1000 mg/L, and the total concentration of magnesium, aluminum, and zinc of 4000 mg/L was prepared. Polyallylamine with a weight average molecular weight of 1500 was added to the above aqueous solution so as to have a solid content concentration of 1000 mg/L. The aqueous solution was then heated to 45° C. Using aqueous ammonia, the aqueous solution adjusted so as to have a pH of 3.5 and a free fluorine concentration of 18 mg/L was provided as a surface treatment liquid.

Example 3

Using an aqueous solution of hexafluoro zirconium (IV), an aqueous solution of hafnium nitrate (IV), magnesium sulfate, aluminum nitrate, zinc chloride, copper nitrate, and cobalt nitrate, an aqueous solution with a zirconium concentration of 1000 mg/L, a hafnium concentration of 500 mg/L, and the total concentration of magnesium, aluminum, zinc, copper, and cobalt of 5150 mg/L was prepared. Malate of polydiallylamine with a weight average molecular weight of 5000 was added to the above aqueous solution so as to have a solid content concentration of 1500 mg/L. The aqueous solution was then heated to 50° C. Using aqueous an aqueous solution of sodium hydroxide and hydrofluoric acid, the aqueous solution adjusted so as to have a pH of 3.8 and a free fluorine concentration of 5 mg/L was provided as a surface treatment liquid.

Example 4

Using an aqueous solution of hexafluoro titanic (IV) acid and magnesium nitrate, an aqueous solution with a titanium concentration of 800 mg/L and a magnesium concentration of 2000 mg/L was prepared. Polyallylamine with a weight average molecular weight of 1000 was added to the above aqueous solution so as to have a solid content concentration of 500 mg/L, polyethyleneimine with a weight average molecular weight of 10000 was added thereto so as to have a solid content concentration of 500 mg/L, and aminated bisphenol was added thereto so as to have a solid content concentration of 200 mg/L. The aqueous solution was then heated to 50° C., and NaNO$_2$ was added thereto so as to have a concentration of 100 mg/L as a pure component. Using an aqueous solution of potassium hydroxide, the aqueous solution adjusted so as to have a pH of 3.8 and a free fluorine concentration of 22 mg/L was provided as a surface treatment liquid. Separately, an aqueous solution of phytic acid with a concentration of 10 mg/L was prepared, and was heated to 50° C. Using aqueous ammonia, the aqueous solution adjusted so as to have a pH of 4.0 was provided as a post-treatment liquid.

Example 5

Using an aqueous solution of hexafluoro titanium (IV), zinc nitrate, and cobalt chloride, an aqueous solution with a titanium concentration of 1200 mg/L and the total concentration of zinc and cobalt of 1650 mg/L was prepared. Polyethyleneimine with a weight average molecular weight of 50000 was added to the above aqueous solution so as to have a solid content concentration of 600 mg/L. The aqueous solution was then heated to 50° C. Using aqueous ammonia, the aqueous solution adjusted so as to have a pH of 3.8 and a free fluorine concentration of 28 mg/L was provided as a surface treatment liquid.

Separately, an aqueous solution of 1-hydroxyethyl-1-phosphonic acid with a concentration of 10 mg/L was prepared, and was heated to 50° C. Using an aqueous solution of sodium hydroxide, the aqueous solution adjusted so as to have a pH of 3.0 was provided as a post-treatment liquid.

Example 6

Using an aqueous solution of titanyl sulfate (IV), aluminum nitrate, zinc sulfate, and copper sulfate, an aqueous solution with a titanium concentration of 2000 mg/L and the total concentration of aluminum, zinc, and copper of 2400 mg/L was prepared. Polyethyleneimine with a weight average molecular weight of 20000 was added to the above aqueous solution so as to have a solid content concentration of 1000 mg/L, and chitosan was added thereto so as to have a solid content concentration of 500 mg/L. The aqueous solution was then heated to 50° C. Using an aqueous solution of sodium hydroxide and an aqueous solution of ammonium hydrogen fluoride, the aqueous solution adjusted so as to have a pH of 3.8 and a free fluorine concentration of 10 mg/L was provided as a surface treatment liquid.

Separately, an aqueous solution of 1-hydroxyethylidene-1,1-diphosphonic acid with a concentration of 10 mg/L was prepared, and was heated to 50° C. Using aqueous ammonium, the aqueous solution adjusted so as to have a pH of 5.0 was provided as a post-treatment liquid.

Example 7

Using an aqueous solution of hexafluoro zirconic (IV) acid, an aqueous solution of hexafluoro hafnic (IV) acid, magnesium nitrate, and zinc nitrate, an aqueous solution with a zirconium concentration of 1000 mg/L, a hafnium concentration of 500 mg/L, and the total concentration of magnesium and zinc of 1650 mg/L was prepared. Polydiallylamine with a weight average molecular weight of 3000 was added to the above aqueous solution so as to have a solid content concentration of 500 mg/L, and chitosan was added thereto so as to have a solid content concentration of 1000 mg/L. The aqueous solution was then heated to 40° C., and NH$_4$NO$_2$ was added thereto so as to have a concentration of 150 mg/L as a pure component. Using aqueous ammonium, the aqueous solution adjusted so as to have a pH of 3.8 and a free fluorine concentration of 35 mg/L was provided as a surface treatment liquid.

Separately, an aqueous solution of aminated bisphenol with a concentration of 5 mg/L was prepared, and was heated to 40° C. Using hydrofluoric acid and an aqueous solution of sodium hydroxide, the aqueous solution adjusted so as to have a pH of 5.0 was provided as a post-treatment liquid.

Example 8

Using an aqueous solution of hexafluoro zirconic (IV) acid, magnesium sulfate, and cobalt sulfate, an aqueous solution with a zirconium concentration of 500 mg/L and the total concentration of magnesium and cobalt of 3800 mg/L was prepared. Polydiallylamine with a weight average molecular weight of 5000 was added to the above aqueous solution so as to have a solid content concentration of 1000 mg/L, and aminated bisphenol was added thereto so as to have a solid content concentration of 300 mg/L. The aqueous solution was then heated to 40° C. Using aqueous ammonium, the aqueous solution adjusted so as to have a pH of 3.8 and a free fluorine concentration of 15 mg/L was provided as a surface treatment liquid.

Separately, an aqueous solution of phosphoric acid with a concentration of 5 mg/L was prepared, and was heated to 40° C. Using an aqueous solution of sodium hydroxide, the aqueous solution adjusted so as to have a pH of 5.0 was provided as a post-treatment liquid.

Example 9

Using an aqueous solution of hexafluoro zirconic (IV) acid, an aqueous solution of hexafluoro titanic (IV) acid, an aqueous solution of hafnium nitrate (IV), copper acetate, and cobalt nitrate, an aqueous solution with a zirconium concentration of 1000 mg/L, a titanium concentration of 500 mg/L, a hafnium concentration of 500 mg/L, and the total concentration of copper and cobalt of 1300 mg/L was prepared. Chitosan was added to the above aqueous solution so as to have a solid content concentration of 1500 mg/L, and aminated poly(p-vinylphenol) was added thereto so as to have a solid content concentration of 1000 mg/L. The aqueous solution was then heated to 40° C. Using an aqueous solution of sodium hydroxide and an aqueous solution of ammonium hydrogen fluoride, the aqueous solution adjusted so as to have a pH of 3.8 and a free fluorine concentration of 50 mg/L was provided as a surface treatment liquid.

Separately, an aqueous solution of aminated bisphenol with a concentration of 5 mg/L was prepared, and was heated to 45° C. Using an aqueous solution of phosphoric acid and aqueous ammonium, the aqueous solution adjusted so as to have a pH of 5.0 was provided as a post-treatment liquid.

Example 10

Using an aqueous solution of zirconium nitrate (IV), aluminum sulfate, zinc nitrate, and cobalt chloride, an aqueous solution with a zirconium concentration of 500 mg/L and the total concentration of aluminum, zinc, and cobalt of 1800 mg/L was prepared. Aminated bisphenol was added to the above aqueous solution so as to have a solid content concentration of 1500 mg/L. The aqueous solution was then heated to 35° C. Using aqueous ammonium and an aqueous solution of ammonium fluoride, the aqueous solution adjusted so as to have a pH of 3.8 and a free fluorine concentration of 45 mg/L was provided as a surface treatment liquid.

Separately, an aqueous solution of phytic acid with a concentration of 30 mg/L was prepared, and was heated to 40° C. Using an aqueous solution of sodium hydroxide, the aqueous solution adjusted so as to have a pH of 5.0 was provided as a post-treatment liquid.

Example 11

Using an aqueous solution of hexafluoro zirconic (IV) acid, magnesium nitrate, zinc sulfate, and copper chloride, an aqueous solution with a zirconium concentration of 1500 mg/L and the total concentration of magnesium, zinc, and copper of 3800 mg/L was prepared. 1-propaneimine was added to the above aqueous solution so as to have a solid content concentration of 300 mg/L. The aqueous solution was then heated to 35° C., and $NH_4NO_3$ was added thereto so as to have a concentration of 100 mg/L as a pure component. Using aqueous ammonium, the aqueous solution adjusted so as to have a pH of 3.5 and a free fluorine concentration of 25 mg/L was provided as a surface treatment liquid.

Separately, an aqueous solution of 1-hydroxyethyl-1-phosphonic acid with a concentration of 50 mg/L was prepared, and was heated to 45° C. Using an aqueous solution of sodium hydroxide, the aqueous solution adjusted so as to have a pH of 4.0 was provided as a post-treatment liquid.

Example 12

Using an aqueous solution of titanium chloride (IV), magnesium nitrate, and zinc sulfate, an aqueous solution with a titanium concentration of 500 mg/L and the total concentration of magnesium and zinc of 3100 mg/L was prepared. Polyallylamine with a weight average molecular weight of 3000 was added to the above aqueous solution so as to have a solid content concentration of 300 mg/L. The aqueous solution was then heated to 40° C. Using an aqueous solution of potassium hydroxide, the aqueous solution adjusted so as to have a pH of 3.5 and a free fluorine concentration of 23 mg/L was provided as a surface treatment liquid.

Separately, an aqueous solution of aminated poly(p-vinylphenol) with a concentration of 5 mg/L was prepared, and was heated to 40° C. Using sulfuric acid and an aqueous solution of sodium hydroxide, the aqueous solution adjusted so as to have a pH of 5.0 was provided as a post-treatment liquid.

Example 13

Using an aqueous solution of zirconium nitrate (IV), aluminum nitrate, and copper nitrate, an aqueous solution with a zirconium concentration of 2000 mg/L and the total concentration of aluminum and copper of 500 mg/L was prepared. Aminated poly(p-vinylphenol) was added to the above aqueous solution so as to have a solid content concentration of 300 mg/L. The aqueous solution was then heated to 40° C. Using an aqueous solution of potassium hydroxide and an aqueous solution of ammonium hydrogen fluoride, the aqueous solution adjusted so as to have a pH of 3.5 and a free fluorine concentration of 40 mg/L was provided as a surface treatment liquid.

Separately, an aqueous solution of phytic acid with a concentration of 30 mg/L was prepared, and was heated to 50° C. Using an aqueous solution of potassium hydroxide, the aqueous solution adjusted so as to have a pH of 5.0 was provided as a post-treatment liquid.

Example 14

Using an aqueous solution of hexafluoro zirconic (IV) acid, magnesium chloride, zinc nitrate, and cobalt sulfate, an aqueous solution with a zirconium concentration of 1500 mg/L and the total concentration of magnesium, zinc, and cobalt of 5650 mg/L was prepared. Chitin was added to the above aqueous solution so as to have a solid content concentration of 300 mg/L. The aqueous solution was then heated to 45° C. Using an aqueous solution of potassium hydroxide, the aqueous solution adjusted so as to have a pH of 3.5 and a free fluorine concentration of 32 mg/L was provided as a surface treatment liquid.

Separately, an aqueous solution of 1-hydroxyethylidene-1, 1-diphosphonic acid with a concentration of 50 mg/L was prepared, and was heated to 55° C. Using nitric acid and aqueous ammonium, the aqueous solution adjusted so as to have a pH of 5.0 was provided as a post-treatment liquid.

Example 15

Using an aqueous solution of potassium hexafluoro zirconic (IV) acid, magnesium nitrate, aluminum nitrate, and zinc sulfate, an aqueous solution with a concentration of zirconium of 1500 mg/L and the total concentration of magnesium, aluminum, and zinc of 7150 mg/L was prepared. Ethyleneimine was added to the above aqueous solution so as to have a solid content concentration of 1500 mg/L. The aqueous solution was then heated to 45° C. Using an aqueous solution of potassium hydroxide, the aqueous solution adjusted so as to have a pH of 4.2 and a free fluorine concentration of 20 mg/L was provided as a surface treatment liquid.

Separately, an aqueous solution of aminated bisphenol with a concentration of 5 mg/L was prepared, and was heated to 50° C. Using hydrochloric acid and aqueous ammonium, the aqueous solution adjusted so as to have a pH of 3.5 was provided as a post-treatment liquid.

Example 16

Using an aqueous solution of titanium nitrate (IV) and zinc nitrate, an aqueous solution with a titanium concentration of 600 mg/L and a zinc concentration of 1500 mg/L was prepared. Polyallylamine with a weight average molecular weight of 3000 was added to the above aqueous solution so as to have a solid content concentration of 500 mg/L, 2-propanimine was added thereto so as to have a solid content concentration of 500 mg/L, chitin was added thereto so as to have a solid content concentration of 500 mg/L, and aminated bisphenol was added thereto so as to have a solid content concentration of 500 mg/L. The aqueous solution was then heated to 45° C., and $H_2O_2$ was added thereto so as to have a concentration of 200 mg/L as a pure component. Using an aqueous solution of potassium hydroxide and hydrofluoric acid, the aqueous solution adjusted to have a pH of 5.0 and a free fluorine concentration of 12 mg/L was provided as a surface treatment liquid.

Separately, an aqueous solution of phosphoric acid with a concentration of 10 mg/L was prepared, and was heated to 60° C. Using an aqueous solution of sodium hydroxide, the aqueous solution adjusted to have a pH of 5.0 was provided as a post-treatment liquid.

Example 17

Using an aqueous solution of hafnium nitrate (IV), magnesium nitrate, and copper nitrate, an aqueous solution with a hafnium concentration of 500 mg/L and the total concentration of magnesium and copper of 2100 mg/L was prepared. Allylamine was added to the above aqueous solution so as to have a solid content concentration of 1500 mg/L. The aqueous solution was then heated to 45° C. Using aqueous ammonium and an aqueous solution of ammonium hydrogen fluoride, the aqueous solution adjusted so as to have a pH of 3.5 and a free fluorine concentration of 27 mg/L was provided as a surface treatment liquid.

Separately, an aqueous solution of phosphoric acid with a concentration of 5 mg/L was prepared, and was heated to 60° C. Using an aqueous solution of potassium hydroxide, the aqueous solution adjusted to have a pH of 4.0 was provided as a post-treatment liquid.

Example 18

Using an aqueous solution of titanyl nitrate (IV) acid, magnesium chloride, and zinc nitrate, an aqueous solution with a titanium concentration of 2000 mg/L and the total concentration of magnesium and zinc of 1750 mg/L was prepared. Polypropyleneimine with a weight average molecular weight of 70000 was added to the above aqueous solution so as to have a solid content concentration of 1500 mg/L. The aqueous solution was then heated to 45° C. Using an aqueous solution of sodium hydroxide and hydrofluoric acid, the aqueous solution adjusted so as to have a pH of 3.5 and a free fluorine concentration of 30 mg/L was provided as a surface treatment liquid.

Separately, an aqueous solution of aminated p-vinylphenol phosphonic acid with a concentration of 10 mg/L was prepared, and was heated to 55° C. Using nitric acid and aqueous ammonium, the aqueous solution adjusted so as to have a pH of 3.0 was provided as a post-treatment liquid.

Example 19

Using an aqueous solution of hexafluoro hafnic (IV) acid, magnesium nitrate, and aluminum nitrate, an aqueous solution with a hafnium concentration of 600 mg/L, and the total concentration of magnesium and aluminum of 1500 mg/L was prepared. Polydiallylamine with a weight average molecular weight of 5000 was added to the above aqueous solution so as to have a solid content concentration of 500 mg/L, polyethyleneimine with a weight average molecular weight of 35000 was added thereto so as to have a solid content concentration of 500 mg/L, and hyaluronic acid was added thereto so as to have a solid content concentration of 500 mg/L. The aqueous solution was then heated to 45° C. Using aqueous ammonium, the aqueous solution adjusted so as to have a pH of 3.5 and a free fluorine concentration of 17 mg/L was provided as a surface treatment liquid.

Separately, an aqueous solution of aminated bisphenol with a concentration of 5 mg/L was prepared, and was heated to 60° C. Using phosphoric acid and aqueous ammonium, the aqueous solution adjusted so as to have a pH of 3.0 was provided as a post-treatment liquid.

Example 20

Using an aqueous solution of hafnium chloride (IV) acid, magnesium nitrate, aluminum sulfate, zinc chloride, copper acetate, and cobalt nitrate, an aqueous solution with a hafnium concentration of 2000 mg/L and the total concentration of magnesium, aluminum, zinc, copper, and cobalt of 2500 mg/L was prepared. Aminated bisphenol was added to the above aqueous solution so as to have a solid content concentration of 1500 mg/L. The aqueous solution was then heated to 45° C. Using aqueous ammonium and an aqueous solution of ammonium hydrogen fluoride, the aqueous solution adjusted so as to have a pH of 2.0 and a free fluorine concentration of 13 mg/L was provided as a surface treatment liquid.

Separately, an aqueous solution of phosphoric acid with a concentration of 5 mg/L was prepared, and was heated to 60° C. Using an aqueous solution of sodium hydroxide, the aqueous solution adjusted to have a pH of 6.0 was provided as a post-treatment liquid.

Comparative Example 1

The ALCHROM 713 (Registered trademark: manufactured by Nihon Parkerizing Co., Ltd.), which is a commercial chromic chromate treatment agent, was diluted with tap water so as to have a concentration of 3.6 wt %. Its total acidity and free acidity were then set to be the center of their catalog values to provide a surface treatment liquid.

Comparative Example 2

Using an aqueous solution of hexafluoro zirconic (IV) acid, magnesium nitrate, aluminum nitrate, zinc nitrate, and cobalt nitrate, an aqueous solution with a zirconium concentration of 100 mg/L and the total concentration of magnesium, aluminum, zinc, and cobalt of 3000 mg/L was prepared. Polyallylamine with a weight average molecular weight of 5000 was added to the above aqueous solution so as to have a solid content concentration of 1500 mg/L. The aqueous solution was then heated to 45° C. Using an aqueous ammonium and hydrofluoric acid, the aqueous solution adjusted so as to have a pH of 3.8 and a free fluorine concentration of 9 mg/L was provided as a surface treatment liquid.

Comparative Example 3

Using an aqueous solution of zirconium nitrate (IV), an aqueous solution of titanium chloride (IV), magnesium chloride, aluminum nitrate, and copper nitrate, an aqueous solution with a zirconium concentration of 100 mg/L, a titanium concentration of 100 mg/L, and the total concentration of magnesium, aluminum, and copper of 3500 mg/L was prepared. Allylamine was added to the above aqueous solution so as to have a solid content concentration of 500 mg/L, ethyleneimine was added thereto so as to have a solid content concentration of 500 mg/L, and aminated bisphenol was added thereto so as to have a solid content concentration of 300 mg/L. The aqueous solution was then heated to 45° C. Using an aqueous ammonium and hydrofluoric acid, the aqueous solution adjusted so as to have a pH of 3.8 and a free fluorine concentration of 15 mg/L was provided as a surface treatment liquid.

Separately, an aqueous solution of 1-hydroxyethyl-1-phosphonic acid with a concentration of 5 mg/L was prepared, and was heated to 45° C. Using aqueous ammonium, the aqueous solution adjusted so as to have a pH of 4.0 was provided as a post-treatment liquid.

Comparative Example 4

Using an aqueous solution of titanium chloride (IV), an aqueous solution of hexafluoro hafnic (IV) acid, zinc sulfate, and cobalt chloride, an aqueous solution with a titanium concentration of 100 mg/L, a hafnium concentration of 100 mg, and the total concentration of zinc and cobalt of 3000 mg/L was prepared. Chondroitin sulfuric acid was added to the above aqueous solution so as to have a solid content concentration of 1200 mg/L, and aminated poly(p-vinylphenol) was added thereto so as to have a solid content concentration of 300 mg/L. The aqueous solution was then heated to 45° C. Using an aqueous solution of sodium hydroxide and an aqueous solution of ammonium hydrogen fluoride, the aqueous solution adjusted so as to have a pH of 3.8 and a free fluorine concentration of 20 mg/L was provided as a surface treatment liquid.

Separately, an aqueous solution containing aminated bisphenol with a concentration of 10 mg/L and phosphoric acid with a concentration of 5 mg/L was prepared, and was heated to 50° C. Using an aqueous solution of potassium hydroxide, the aqueous solution adjusted so as to have a pH of 5.0 was provided as a post-treatment liquid.

Comparative Example 5

Using an aqueous solution of zirconium chloride (IV), magnesium chloride, copper nitrate, and cobalt sulfate, an aqueous solution with a zirconium concentration of 1000 mg/L and the total concentration of magnesium, copper, and cobalt of 3000 mg/L was prepared. Polyallylamine with a weight average molecular weight of 5000 was added to the above aqueous solution so as to have a solid content concentration of 50 mg/L. The aqueous solution was then heated to 45° C. Using an aqueous solution of potassium hydroxide and an aqueous solution of sodium hydrogen fluoride, the aqueous solution adjusted so as to have a pH of 3.8 and a free fluorine concentration of 25 mg/L was provided as a surface treatment liquid.

Separately, an aqueous solution containing aminated bisphenol with a concentration of 5 mg/L, phosphoric acid with a concentration of 5 mg/L, and phytic acid with a concentration of 5 mg/L was prepared, and was heated to 60° C. Using an aqueous ammonium, the aqueous solution adjusted so as to have a pH of 6.0 was provided as a post-treatment liquid.

Comparative Example 6

Using an aqueous solution of zirconium nitrate (IV), an aqueous solution of titanium chloride (IV), aluminum nitrate, and zinc sulfate, an aqueous solution with a zirconium concentration of 500 mg/L, a titanium concentration of 500 mg/L, and the total concentration of aluminum and zinc of 3000 mg/L was prepared. Diallylamine was added to the above aqueous solution so as to have a solid content concentration of 100 mg/L, and polyethyleneimine with a weight average molecular weight of 10000 was added thereto so as to have a solid content concentration of 50 mg/L. The aqueous solution was then heated to 45° C. Using an aqueous solution of sodium hydroxide and hydrofluoric acid, the aqueous solution adjusted so as to have a pH of 3.8 and a free fluorine concentration of 35 mg/L was provided as a surface treatment liquid.

Separately, an aqueous solution of aminated poly(p-vinylphenol) with a concentration of 10 mg/L was prepared, and was heated to 40° C. Using nitric acid and an aqueous solution of sodium hydroxide, the aqueous solution adjusted so as to have a pH of 4.5 was provided as a post-treatment liquid.

Comparative Example 7

Using an aqueous solution of hexafluoro hafnic (IV) acid and magnesium sulfate, an aqueous solution with a hafnium concentration of 1000 mg and a magnesium concentration of 3000 mg/L was prepared. Polydiallylamine with a weight average molecular weight of 1000 was added to the above aqueous solution so as to have a solid content concentration of 50 mg/L, and hyaluronic acid was added thereto so as to have a solid content concentration of 50 mg/L. The aqueous solution was then heated to 45° C. Using an aqueous solution of sodium hydroxide and an aqueous solution of ammonium fluoride, the aqueous solution adjusted so as to have a pH of 3.8 and a free fluorine concentration of 50 mg/L was provided as a surface treatment liquid.

Separately, an aqueous solution of phosphoric acid with a concentration of 10 mg/L was prepared, and was heated to 55° C. Using nitric acid and aqueous ammonium, the aqueous solution adjusted so as to have a pH of 3.0 was provided as a post-treatment liquid.

(Measurement of Coating Mass of Coating)

The coating masses of the coatings formed in Examples 1 to 20 and Comparative Examples 2 to 7 were measured. Specifically, Wa, which is the coating mass of the metallic elements of the component (A), was measured using a fluorescence X-ray analyzer (the XRF-1800 manufactured by Shimadzu Corp.).

Wb, which is the carbon-equivalent coating mass of the compounds of the component (B), was measured using a carbon content analyzer (the LECO manufactured by LECO (in USA)). For Examples 4 to 7, 9 to 15, 18 and 19, and Comparative Examples 3 to 6, the above measurements were performed before performing the post-treatment process.

Wp, which is the sum of the coating mass of phosphorus of amino-modified phenol, phytic acid, or phosphoric acid ester and the carbon-equivalent coating mass contained in the post-treatment liquid, was for Examples 4 to 7, 9 to 15, 18 and 19, and Comparative Examples 3 to 5, calculated by adding the value obtained by subtracting the value before performing the post-treatment (Wb) from the value measured by the carbon content analyzer (the LECO manufactured by LECO (in USA)) to the coating mass of phosphorous measured by the fluorescence X-ray analyzer (the XRF-1800 manufactured by Shimadzu Corp.). The results are shown in Table 1.

(Evaluations of Coatings)

Evaluations of the coatings formed in Examples 1 to 20 and Comparative Examples 1 to 5 were performed on the basis of SST (Salt Spray Test). Specifically, a 5 wt % aqueous solution of sodium chloride was sprayed in a test room maintained at 35° C. The spray amount was checked by collecting a liquid amount accumulated in a sampling container installed in the test room per one hour, and was adjusted to be 1.5±0.5 mL/hr with respect to a horizontal collection area of 80 $cm^2$.

By SST a coating in which an area of part in which white rust has been formed is less than 5% with respect to an area treated was evaluated to be A, a coating with the above percentage of 5% or more and less than 10% was evaluated to be B, and a coating with the above percentage of 10% or more was evaluated to be C.

The results are shown in Table 1.

As is clear from Table 1, the zinc-based metallic material formed with the coating obtained using the treatment liquid of the present invention (Examples 1 to 20) showed, without containing chromium compounds, the same level of bare corrosion resistance as a chromate-treated case (Comparative Example 1).

In contrast, cases in which the concentration of the component (A) is too low (Comparative Examples 2 to 4) were inferior in bare corrosion resistance. Cases in which the component (B) is too low (Comparative Examples 5 to 7) were inferior in bare corrosion resistance similarly.

TABLE 1

(section 1)

| Examples/ Comparative examples | No. | Plate to be treated | Composition of chemical conversion liquid (surface treatment liquid) (mg/L) | | | | | | | | |
|---|---|---|---|---|---|---|---|---|---|---|---|
| | | | Ti | Zr | Hf | Mg | Al | Zn | Cu | Co | Allylamino compound |
| Examples | 1 | EG plate | | | | 500 | 1000 | 100 | | 600 | 600 |
| | 2 | EG plate | 1000 | | | 2500 | 500 | 1000 | | | 1000 |
| | 3 | EG plate | | | 1000 | 500 | 1500 | 500 | 2000 | 150 | 1000 | 1500 |
| | 4 | EG plate | 800 | | | 2000 | | | | | 500 |
| | 5 | EG plate | 1200 | | | | | 1000 | | 650 | |
| | 6 | EG plate | 2000 | | | | 600 | 1000 | 800 | | |
| | 7 | EG plate | | 1000 | 500 | 1000 | | 650 | | | 500 |
| | 8 | EG plate | | 500 | | 3000 | | | | 800 | 1000 |
| | 9 | EG plate | 500 | 1000 | 500 | | | | 800 | 1000 | |
| | 10 | EG Plate | | 500 | | | 500 | 800 | | 500 | |
| | 11 | EG plate | | 1500 | | 1600 | | 1200 | 1000 | | |
| | 12 | EG plate | 500 | | | 600 | | 2500 | | | 300 |
| | 13 | EG plate | | 2000 | | | 250 | | 250 | | |
| | 14 | EG plate | | 1500 | | 8000 | | 2000 | | 650 | |
| | 15 | EG plate | | 1500 | | 8000 | 650 | 3500 | | | |
| | 16 | EG plate | 600 | | | | | 1500 | | | 500 |
| | 17 | EG plate | | | | 500 | 2000 | | 100 | | 1500 |
| | 18 | EG plate | 2000 | | | 1000 | | 750 | | | |
| | 19 | EG plate | | | 600 | 1000 | 500 | | | | 500 |
| | 20 | Zinc alloy die-cast plate | | | 2000 | 500 | 500 | 500 | 500 | 500 | |
| Comparative examples | 1 | EG plate | | | | Chromate treatment | | | | | |
| | 2 | EG plate | | 100 | | 500 | 500 | 1500 | | 500 | 1500 |
| | 3 | EG plate | 100 | 100 | | | 200 | 2800 | | 500 | 500 |
| | 4 | EG plate | 100 | | 100 | | | 2000 | | 1000 | |
| | 5 | EG plate | | 1000 | | | 1500 | | 1000 | 500 | 50 |
| | 6 | EG plate | 500 | 500 | | | 1200 | 1800 | | | 100 |
| | 7 | EG plate | | | 1000 | 3000 | | | | | 50 |

(section 1)

| | | Composition of chemical conversion liquid (surface treatment Liquid) (mg/L) | | | | | Conversion Treatment condition | | | |
|---|---|---|---|---|---|---|---|---|---|---|
| Examples/ Comparative examples | No. | Imino compound | Aminated polysaccharide | Amino-modified phenol | Others | Free fluorine concentration | pH | Temp./ ° C. | Treatment method | Treating time/ sec. |
| Examples | 1 | | | | $H_2O_2$ | 25 | 3.8 | 45 | immersion | 120 |
| | 2 | | | | | 18 | 3.5 | 45 | immersion | 120 |
| | 3 | | | | | 5 | 3.8 | 50 | immersion | 30 |
| | 4 | 500 | | 200 | $NaNO_2$ | 22 | 3.8 | 50 | immersion | 60 |
| | 5 | 600 | | | | 28 | 3.8 | 50 | immersion | 60 |

TABLE 1-continued

| No. | col1 (mg/L) | col2 (mg/L) | col3 (mg/L) | Compound | value | pH | Temp. (°C) | Method | Time (sec.) |
|---|---|---|---|---|---|---|---|---|---|
| 6 | 1000 | 500 | | | 10 | 3.8 | 50 | Spray | 90 |
| 7 | | 1000 | | $NH_4NO_2$ | 35 | 3.8 | 40 | Spray | 90 |
| 8 | | | 300 | | 15 | 3.8 | 40 | Spray | 30 |
| 9 | | 1500 | 1000 | | 50 | 3.8 | 40 | Spray | 90 |
| 10 | | | 1500 | | 45 | 3.8 | 35 | immersion | 120 |
| 11 | 300 | | | $NH_4NO_3$ | 25 | 3.5 | 35 | immersion | 120 |
| 12 | | | | | 23 | 3.5 | 40 | immersion | 30 |
| 13 | | | 300 | | 40 | 3.5 | 40 | immersion | 120 |
| 14 | | 300 | | | 32 | 3.5 | 45 | immersion | 30 |
| 15 | 1500 | | | | 20 | 4.2 | 45 | immersion | 120 |
| 16 | 500 | 500 | 500 | $H_2O_2$ | 12 | 5.0 | 45 | immersion | 120 |
| 17 | | | | | 27 | 3.5 | 45 | immersion | 30 |
| 18 | 1500 | | | | 30 | 3.5 | 45 | immersion | 90 |
| 19 | 500 | 500 | | | 17 | 3.5 | 45 | immersion | 90 |
| 20 | | | 1500 | | 13 | 2.0 | 45 | immersion | 120 |
| Comparative examples 1 | | | | Chromate treatment | | | | | |
| 2 | | | | | 9 | 3.8 | 45 | immersion | 120 |
| 3 | 500 | | 300 | | 15 | 3.8 | 45 | immersion | 120 |
| 4 | | 1200 | 300 | | 20 | 3.8 | 45 | immersion | 120 |
| 5 | | | | | 25 | 3.8 | 45 | immersion | 120 |
| 6 | 50 | | | | 35 | 3.8 | 45 | immersion | 120 |
| 7 | | 50 | | | 50 | 3.8 | 45 | immersion | 120 |

(Section 2)

| Examples/ Comparative examples | No. | Amino-modified phenol (mg/L) | Phosphoric acid (mg/L) | Organophosphorous compound (mg/L) | pH | Temp. (°C.) | Treating time (sec.) |
|---|---|---|---|---|---|---|---|
| Examples | 1 | | | not applicable | | | |
| | 2 | | | not applicable | | | |
| | 3 | | | not applicable | | | |
| | 4 | | | 10 | 4.0 | 50 | 30 |
| | 5 | | | 10 | 3.0 | 50 | 30 |
| | 6 | | | 10 | 5.0 | 50 | 30 |
| | 7 | 5 | | | 5.0 | 40 | 30 |
| | 8 | | 5 | | 5.0 | 40 | 30 |
| | 9 | 5 | | | 5.0 | 45 | 30 |
| | 10 | | | 30 | 4.5 | 40 | 30 |
| | 11 | | | 50 | 4.0 | 45 | 30 |
| | 12 | 5 | | | 5.0 | 40 | 30 |
| | 13 | | | 30 | 5.0 | 50 | 30 |
| | 14 | | | 50 | 5.0 | 55 | 30 |
| | 15 | 5 | | | 3.5 | 50 | 60 |
| | 16 | | 10 | | 5.0 | 60 | 90 |
| | 17 | | 5 | | 4.0 | 60 | 30 |
| | 18 | 10 | | | 3.0 | 55 | 30 |
| | 19 | 5 | | | 3.0 | 60 | 30 |
| | 20 | | 5 | | 6.0 | 60 | 30 |
| Comparative examples | 1 | | | not applicable | | | |
| | 2 | | | not applicable | | | |
| | 3 | | | 5 | 4.0 | 45 | 30 |
| | 4 | 10 | 5 | | 5.0 | 50 | 90 |
| | 5 | 5 | 5 | 5 | 6.0 | 60 | 30 |
| | 6 | 10 | | | 4.5 | 40 | 60 |
| | 7 | | 10 | | 3.0 | 55 | 30 |

(Section 2)

| Examples/ Comparative examples | No. | Coating mass (mg/m$^2$) Wa | Wb | Wp | Evaluation SST 24 hr | SST 72 hr | SST 120 hr |
|---|---|---|---|---|---|---|---|
| Examples | 1 | 112 | 35 | — | A | A | B |
| | 2 | 84 | 42 | — | A | A | B |
| | 3 | 68 | 26 | — | A | A | B |
| | 4 | 55 | 30 | 6 | A | A | A |
| | 5 | 64 | 31 | 9 | A | A | A |
| | 6 | 73 | 35 | 18 | A | A | A |
| | 7 | 91 | 33 | 7 | A | A | A |
| | 8 | 53 | 24 | — | A | A | A |
| | 9 | 76 | 28 | 11 | A | A | A |
| | 10 | 72 | 38 | 15 | A | A | A |
| | 11 | 103 | 36 | 21 | A | A | A |
| | 12 | 62 | 23 | 7 | A | A | A |
| | 13 | 89 | 28 | 8 | A | A | A |
| | 14 | 77 | 25 | 12 | A | A | A |

TABLE 1-continued

|  |  |  |  |  |  |  |  |
|---|---|---|---|---|---|---|---|
|  | 15 | 121 | 48 | 10 | A | A | A |
|  | 16 | 58 | 52 | — | A | A | A |
|  | 17 | 73 | 26 | — | A | A | A |
|  | 18 | 66 | 36 | 9 | A | A | A |
|  | 19 | 52 | 31 | 16 | A | A | A |
|  | 20 | 60 | 22 | — | A | A | A |
| Comparative examples | 1 | — | — | — | A | A | A |
|  | 2 | 46 | 14 | — | C | — | — |
|  | 3 | 51 | 18 | 13 | C | — | — |
|  | 4 | 45 | 13 | 19 | C | — | — |
|  | 5 | 67 | 16 | 21 | C | — | — |
|  | 6 | 54 | 14 | 14 | C | — | — |
|  | 7 | 52 | 15 | 15 | C | — | — |

What is claimed is:

1. A surface treatment method for a zinc-based metallic material comprising a surface treatment process in which a surface of a zinc-based metallic material is:
brought into contact with a surface treatment liquid comprising components:
(A) at least one metallic element selected from the group consisting of Ti, Zr, and Hf; and
(B) at least one compound selected from the group consisting of an imino compound, aminated polysaccharide, amino-modified phenol, and derivatives thereof, wherein
the total concentration of the metallic elements of said component (A) is 500 to 2000 mg/L, and
the total concentration of the compounds of said component (B) is 300 to 3000 mg/L;
wherein:
Component (A) comprises Zr;
Component (B) comprises 1-propane imine; and
the surface treatment liquid further comprises:
(C) fluorine;
(D) metallic elements Mg, Zn and Cu, wherein total concentration of the metallic elements of said component (D) is from 500 to 10000 mg/L.

2. The surface method for a zinc-based metallic material according to claim 1, further comprising component (E) selected from the group consisting of $HNO_3$, $HNO_2$, $H_2O_2$, and salts thereof.

3. The surface method for a zinc-based metallic material according to claim 1, of which pH is 2 to 5.

4. The surface treatment method for a zinc-based metallic material according to claim 1 comprising a post-treatment process in which the surface of said zinc-based metallic material is brought into contact with a post-treatment liquid containing at least one compound selected from the group consisting of phosphoric acid, amino-modified phenol, an amino-modified phenol derivative, and an organophosphorus compound after the surface treatment process.

5. The surface treatment method for a zinc-based metallic material according to claim 4, wherein a complex coating formed on the surface of said zinc-based metallic material in said post-treatment process satisfies equations (1) to (3):

$$Wa \geq 50 \text{ mg/m}^2 \quad (1)$$

$$Wb \geq 20 \text{ mg/m}^2 \quad (2)$$

$$Wp \geq 5 \text{ mg/m}^2 \quad (3),$$

wherein
Wa represents coating mass of the at least one metallic element of said component (A), Wb represents carbon-equivalent coating mass of the at least one compound of said component (B), and Wp represents a sum of coating mass of a phosphorus element and the carbon-equivalent coating mass of organic compounds contained in said post-treatment liquid.

6. The surface treatment method for a zinc-based metallic material according to claim 4, wherein pH of said post-treatment liquid is 3 to 6.

7. The surface treatment method for a zinc-based metallic material according to claim 1, further comprising a degreasing process for performing degreasing treatment on said zinc-based metallic material before said surface treatment process.

8. The surface treatment method for a zinc-based metallic material according to claim 1 wherein the zinc-based metallic material comprises a galvanized coating over a steel substrate.

9. A surface treatment method for a zinc-based metallic material comprising a surface treatment process in which a surface of a zinc-based metallic material is:
acid cleaned;
brought into contact with a surface treatment liquid comprising components:
(A) at least one metallic element selected from the group consisting of Ti, Zr, and Hf; and
(B) at least one compound selected from the group consisting of an imino compound, aminated polysaccharide, amino-modified phenol, and derivatives thereof, wherein
the total concentration of the metallic elements of said component (A) is 500 to 2000 mg/L, and
the total concentration of the compounds of said component (B) is 300 to 3000 mg/L
dried by being heated;
wherein:
Component (A) comprises Zr;
Component (B) comprises 1-propane imine; and
the surface treatment liquid further comprises:
(C) fluorine in an amount of 5-50 ppm;
(D) metallic elements Mg, Zn and Cu, wherein total concentration of the metallic elements of said component (D) is from 1000 to 5000 mg/L; and
(E) oxidizers selected from the group consisting of $HNO_3$, $HNO_2$, $H_2O_2$, and salts thereof.

10. The surface treatment method for a zinc-based metallic material according to claim 9, comprising a post-treatment process in which the surface of said zinc-based metallic material is brought into contact with a post-treatment liquid containing at least one compound selected from the group consisting of an amino-modified phenol, an amino-modified phenol derivative, and an organophosphorus compound after the surface treatment process.

11. The surface treatment method for a zinc-based metallic material according to claim 10, wherein a complex coating formed on the surface of said zinc-based metallic material in said post-treatment process satisfies equations (1) to (3):

$$Wa \geq 50 \text{ mg/m}^2 \tag{1}$$

$$Wb \geq 20 \text{ mg/m}^2 \tag{2}$$

$$Wp \geq 5 \text{ mg/m}^2 \tag{3}$$

wherein
Wa represents coating mass of the at least one metallic element of said component (A), Wb represents carbon-equivalent coating mass of the at least one compound of said component (B), and Wp represents a sum of coating mass of a phosphorus element and the carbon-equivalent coating mass of organic compounds contained in said post-treatment liquid.

12. The surface treatment method for a zinc-based metallic material according to claim 11 wherein the zinc-based metallic material comprises a galvanized coating over a steel substrate.

13. A surface treatment method for a zinc-based metallic material comprising:
   cleaning and conversion coating a surface of a zinc-based metallic material by contacting the surface with a surface treatment liquid comprising components:
   (A) at least one metallic element selected from the group consisting of Ti, Zr, and Hf wherein total concentration of the metallic elements of said component (A) is 500 to 2000 mg/L;
   (B) at least one compound selected from the group consisting of an imino compound, aminated polysaccharide, amino-modified phenol, and derivatives thereof wherein total concentration of the compounds of said component (B) is 300 to 3000 mg/L;
   (C) 5-50 ppm fluorine; and
   (D) at least one metallic element selected from the group consisting of Mg, Al, Zn, Cu and Co, wherein total concentration of the metallic elements of said component (D) is 500 to 10000 mg/L;
   wherein the surface treatment further comprises at least one surfactant;
   Component (A) comprises Zr; and Component (B) comprises 1-propane imine wherein Component (D) comprises Cu and at least one of Ma and Zn.

14. The surface treatment method for a zinc-based metallic material according to claim 13 comprising a post-treatment process in which the surface of said zinc-based metallic material is brought into contact with a post-treatment liquid containing at least one compound selected from the group consisting of phosphoric acid, amino-modified phenol, an amino-modified phenol derivative, and an organophosphorus compound after the surface treatment process and before being dried by being heated.

15. The surface treatment method for a zinc-based metallic material according to claim 14, wherein a complex coating formed on the surface of said zinc-based metallic material in said post-treatment process satisfies equations (1) to (3):

$$Wa \geq 50 \text{ mg/m}^2 \tag{1}$$

$$Wb \geq 20 \text{ mg/m}^2 \tag{2}$$

$$Wp \geq 5 \text{ mg/m}^2 \tag{3}$$

wherein
Wa represents coating mass of the at least one metallic element of said component (A), Wb represents carbon-equivalent coating mass of the at least one compound of said component (B), and Wp represents a sum of coating mass of a phosphorus element and the carbon-equivalent coating mass of organic compounds contained in said post-treatment liquid.

16. The surface treatment method for a zinc-based metallic material according to claim 13 wherein the zinc-based metallic material comprises a galvanized coating over a steel substrate.

* * * * *

UNITED STATES PATENT AND TRADEMARK OFFICE
CERTIFICATE OF CORRECTION

PATENT NO. : 8,524,323 B2  
APPLICATION NO. : 12/576628  
DATED : September 3, 2013  
INVENTOR(S) : Hidenori Nagai et al.

Page 1 of 1

It is certified that error appears in the above-identified patent and that said Letters Patent is hereby corrected as shown below:

In the Specification

Column 20, Table 1 (Row 1 EG plate – Column Co): Change "600" to -- 500 --.

In the Claims

Column 26, Line 5: Change "Ma" to -- Mg --.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*